United States Patent
Parish et al.

(10) Patent No.: US 12,449,063 B2
(45) Date of Patent: Oct. 21, 2025

(54) FLUID FLOW CONTROL DEVICES AND SYSTEMS, AND METHODS OF FLOWING FLUIDS THERETHROUGH

(71) Applicant: FLOWSERVE PTE. LTD., Singapore (SG)

(72) Inventors: Jeff Parish, Springville, UT (US); Bradford Haines, Spanish Fork, UT (US); Gifford Decker, Springville, UT (US)

(73) Assignee: Flowserve Pte. Ltd., Singapore (SG)

( * ) Notice: Subject to any disclaimer, the term of this patent is extended or adjusted under 35 U.S.C. 154(b) by 0 days.

(21) Appl. No.: 18/369,700

(22) Filed: Sep. 18, 2023

(65) Prior Publication Data
US 2024/0003465 A1    Jan. 4, 2024

Related U.S. Application Data

(60) Continuation of application No. 17/673,638, filed on Feb. 16, 2022, now Pat. No. 11,761,558, which is a continuation of application No. 17/104,941, filed on Nov. 25, 2020, now Pat. No. 11,287,059, which is a continuation of application No. 16/139,968, filed on Sep. 24, 2018, now Pat. No. 10,941,878, which is a division of application No. 13/840,906, filed on Mar. 15, 2013, now abandoned.

(51) Int. Cl.
*F16K 47/04* (2006.01)

(52) U.S. Cl.
CPC ......... *F16K 47/04* (2013.01); *Y10T 137/0402* (2015.04)

(58) Field of Classification Search
CPC ....................................................... F16K 47/12
USPC .................................. 137/625.3; 138/42, 43
See application file for complete search history.

(56) References Cited

U.S. PATENT DOCUMENTS

| | | | |
|---|---|---|---|
| 880,087 | A | 2/1908 | Luesebrink |
| 1,373,829 | A | 4/1921 | Perdue |
| 1,619,444 | A | 3/1927 | Gilford |
| 3,252,480 | A | 5/1966 | Odendahl |
| 3,469,591 | A | 9/1969 | Odendahl |

(Continued)

FOREIGN PATENT DOCUMENTS

| | | |
|---|---|---|
| DE | 4239767 A1 | 9/1993 |
| DE | 9219083 U1 | 9/1997 |

(Continued)

OTHER PUBLICATIONS

Emerson Process Management Instruction Manual, Design CAV4 Control Valve, Oct. 2006, 20 pages.

(Continued)

*Primary Examiner* — Michael R Reid
(74) *Attorney, Agent, or Firm* — BKRIP LLC

(57) ABSTRACT

Fluid flow control devices comprise a cylindrical body extending along a longitudinal axis and having a sidewall. The cylindrical body has a first channel extending longitudinally along the sidewall and a second channel extending longitudinally along the sidewall. At least a portion of one of the at least one first channel and the at least one second channel extends longitudinally at an oblique angle with respect to the longitudinal axis to form a pattern of channels for improving the flow characteristics of a fluid through the channels.

20 Claims, 3 Drawing Sheets

(56) References Cited

U.S. PATENT DOCUMENTS

| | | |
|---|---|---|
| 3,688,800 A | 9/1972 | Hayner |
| 3,851,526 A | 12/1974 | Drexel |
| 3,888,162 A | 6/1975 | Maenner |
| 3,907,028 A | 9/1975 | Lawson |
| 3,971,411 A | 7/1976 | Baumann |
| 4,079,754 A | 3/1978 | Porter |
| 4,105,048 A | 8/1978 | Self |
| 4,127,146 A | 11/1978 | Self |
| 4,176,683 A | 12/1979 | Leibinsohn |
| 4,177,947 A | 12/1979 | Menzel |
| 4,335,744 A | 6/1982 | Bey |
| RE31,570 E | 5/1984 | Drexel |
| 4,593,446 A | 6/1986 | Hayner |
| RE32,197 E | 7/1986 | Self |
| 4,600,152 A | 7/1986 | Samueli |
| 4,938,450 A | 7/1990 | Tripp |
| 5,772,178 A * | 6/1998 | Bey ............... F16K 47/045 251/118 |
| 5,803,119 A | 9/1998 | Steinke |
| 6,039,076 A | 3/2000 | Hemme |
| 6,095,196 A | 8/2000 | McCarty |
| 6,244,297 B1 | 6/2001 | Baumann |
| 6,340,325 B1 | 1/2002 | Chen |
| 6,581,902 B2 | 6/2003 | Michau |
| 6,701,957 B2 | 3/2004 | McCarty |
| 6,782,920 B2 | 8/2004 | Steinke |
| 6,935,370 B2 | 8/2005 | McCarty |
| 6,981,689 B2 | 1/2006 | Mihaylov |
| 7,089,961 B2 | 8/2006 | Morton |
| 7,276,077 B2 | 10/2007 | Zadno-Azizi |
| 8,361,038 B2 | 1/2013 | McKinnon |
| 8,881,768 B2 | 11/2014 | Haines |
| 10,941,878 B2 * | 3/2021 | Parish ............... F16K 47/04 |
| 11,287,059 B2 | 3/2022 | Parish |
| 2003/0188787 A1 | 10/2003 | Steinke |
| 2004/0004203 A1 | 1/2004 | Smith |
| 2004/0168730 A1 | 9/2004 | McCarty |
| 2006/0191584 A1 | 8/2006 | Haines |
| 2007/0028977 A1 | 2/2007 | Goulet |
| 2007/0040136 A1 | 2/2007 | Caprera |
| 2014/0264132 A1 | 9/2014 | Parish |
| 2015/0060710 A1 | 3/2015 | Haines |

FOREIGN PATENT DOCUMENTS

| | | |
|---|---|---|
| FR | 1546358 A | 11/1968 |
| GB | 1600480 A | 10/1981 |
| GB | 2458264 A | 9/2009 |
| JP | H01502286 A | 8/1989 |
| JP | 2000065220 A | 3/2000 |
| JP | 2009002507 A | 1/2009 |
| WO | 1997023742 A1 | 7/1997 |
| WO | 2001069114 A1 | 9/2001 |
| WO | 2007074342 A1 | 7/2007 |
| WO | 2008032078 A1 | 3/2008 |
| WO | 2010138119 A1 | 12/2010 |

OTHER PUBLICATIONS

Emerson Process Management Product Bulletin, Cavitrol III One-, Two-, and Three-Stage Trims, Feb. 2008, 12 pages.
Extended EP Search Report for European Patent Application No. 09845340, dated Feb. 28, 2013, 7 pages.
Extended European Search Report for European Application No. 13877937.6, dated Sep. 30, 2016, 11 pages.
First Examination Report for German Application No. 112009004804.8, dated Jun. 1, 2017, 15 pages.
Genuine DRAG-Only by CCI, 2003, 4 pages.
International Preliminary Report on Patentability for International Application No. PCT/US2009/045344, dated Nov. 29, 2011, 6 pages.
International Preliminary Report on Patentability for International Application No. PCT/US2013/033888, dated Sep. 24, 2015, 13 pages.
International Search Report and Written Opinion for International Application No. PCT/US2009/045344, dated Mar. 3, 2010, 9 pages.
KIPOs Notice of Final Rejection (english translation) of Korean Patent Application No. 10-2011-7030967 dated Mar. 18, 2016, 12 pages.
KIPOs Notice of Preliminary Rejection of Korean Patent Application No. 10-2015-7028406 dated Jan. 19, 2017, 29 pages.
Machine Translation of DE4239767 (Year: 1993).
Masoneilan Dresser Catalogue No. 386, Vannes VRT, Vanes Ant-cavitation avex clapet/siege a resistance variable pour pressions differentielles elevees, 1979, 12 pages, Masoneilan International Inc.
Notice of Preliminary Rejection for Korean Application No. 10-2011-7030967, dated Sep. 15, 2015, 12 pages.
PCT International Search Report and Written Opinion for Application No. PCT/US2013/033888, dated Dec. 16, 2013.

* cited by examiner

FLUID FLOW CONTROL DEVICES AND SYSTEMS, AND METHODS OF FLOWING FLUIDS THERETHROUGH

CROSS-REFERENCE TO RELATED APPLICATIONS

This application is a continuation of U.S. patent application Ser. No. 17/673,638, filed Feb. 16, 2022, which application is a continuation of U.S. patent application Ser. No. 17/104,941, filed Nov. 25, 2020, which application is a continuation of U.S. patent application Ser. No. 16/139,968, filed Sep. 24, 2018, which application is a divisional of U.S. patent application Ser. No. 13/840,906, filed Mar. 15, 2013, the disclosure of each of which is hereby incorporated herein in its entirety by this reference.

TECHNICAL FIELD

The present disclosure relates generally to fluid flow control devices. More particularly, embodiments of the present disclosure relate to devices configured to reduce a pressure and energy of a fluid passing therethrough.

BACKGROUND

In many areas of industry, it is often necessary to reduce the pressure and energy of fluids (both liquids and gases) within a pipeline or valve. One or more control devices may be employed for this purpose. Various designs for control devices have been presented in the art. For example, a device may be employed to divide the flow through the device into a plurality of separate streams configured as a plurality of tortuous fluid flow paths within the device. As fluid passes through the tortuous fluid flow paths, the fluid changes direction many times. Furthermore, as the fluid travels through the tortuous fluid flow paths, the overall cross-sectional area of the fluid flow path may increase to provide a decrease in the velocity of the fluid within the flow path. The fluid pressure and energy of the fluid is partially dissipated along such paths as a result of losses caused by friction between walls of the path, rapid changes in fluid direction and expansion or contraction chambers. These devices may include what are commonly referred to as "tortuous path trim devices."

A fluid flow control device is often provided within a body of a valve, such as a control valve, having a body that is conventionally configured to direct the fluid from an inlet towards the hollow, cylindrical fluid flow control device. The valve may also be configured to direct fluid passing through the fluid flow control device to the exterior thereof towards a fluid outlet. The valve may include a piston, ball, disk, or other device configured to be inserted into a central region of the valve to interrupt fluid flow through the valve and to close the valve.

Pressurized fluids contain stored mechanical potential energy. A fluid flow control device dissipates this energy by reducing the pressure and velocity of the fluid. As the fluid flows through the fluid pathways, the fluid flow may be turbulent. Turbulent fluid has associated pressure and velocity fluctuations that act upon the structural elements of the pipes and fluid control devices in which the fluid is flowing. These pressure and velocity fluctuations are generally accompanied by other problems such as erosion, noise, vibration, and cavitation. In many applications, these accompanying problems are undesirable or unacceptable characteristics of a fluid flow control device. Conventional fluid flow control devices have not adequately limited problems associated with pressure and velocity fluctuations associated with fluids.

BRIEF SUMMARY

Various embodiments of the present disclosure comprise fluid flow control devices that overcome many of the problems of conventional fluid flow control devices. The present disclosure describes embodiments of flow control devices that include fluid paths configured to better control cavitation, vibration, and other problems associated with fluid flow control.

In one or more embodiments, a fluid flow control device may comprise a substantially cylindrical body that extends along a longitudinal axis and that has a sidewall. The cylindrical body may include at least one first channel extending longitudinally along the sidewall and at least one second channel extending longitudinally along the sidewall. At least a portion of one of the at least one first channel and the at least one second channel extends longitudinally at an oblique angle with respect to the longitudinal axis to form a pattern of channels for improving the flow characteristics of a fluid through the channels.

In a further embodiment, the at least one first channel and the at least one second channel extend at least substantially longitudinally from a first end of the cylindrical body to a second end of the cylindrical body. In a further embodiment, the at least one first channel and the at least one second channel intersect. In yet a further embodiment, the cylindrical body is a first cylindrical body, and the fluid flow control device may further comprise a second cylindrical body concentrically situated in an interior cylindrical cavity of the first cylindrical body. In other embodiments, one or more additional cylindrical bodies may each be concentrically situated in an interior cylindrical cavity of another cylindrical body. In one embodiment, the first cylindrical body and the second cylindrical body each have a curved sidewall such that the first cylindrical body and the second cylindrical body form a substantially spherical ball valve.

In further embodiments of the flow control device, the at least one first channel intersects a plurality of other channels. In one embodiment, the at least one first channel and at least one second channel may be configured in a cavitation pattern to control cavitation of a substance passing through the first channel and the second channel. For example, the least one first channel and the at least one second channel may form an offset brick pattern on the sidewall, or the at least one first channel and the at least one second channel form a diamond pattern on the sidewall. In a further embodiment, at least one of the at least one first channel and the at least one second channel extends longitudinally along the sidewall in a zigzag pattern. In a further embodiment, the at least one first channel and at least one second channel do not intersect.

In various embodiments, the channels may be configured in various shapes and sizes. In one embodiment, at least one of the first channel and second channel has a rounded interior surface. In another embodiment, at least one of the first channel and second channel has a squared interior surface having two wall surfaces formed substantially orthogonal to a bottom surface. In yet another embodiment, at least one of the first channel and second channel has an angled interior surface comprising two wall surfaces intersecting at an angle. In a particular embodiment, at least one of the first channel and the second channel has a varying depth with respect to a surface of the sidewall. In a further embodiment, at least one of the first channel and the second channel has a varying width along the longitudinal axis. In another embodiment, the cylindrical body is configured as a plug, and the fluid flow control device further comprises a seat ring situated around the plug.

Additional embodiments include methods for forming a fluid flow control device. In one or more embodiments of such methods, the methods include forming at least one first groove in a surface of at least one substantially cylindrical body, the at least one first groove extending longitudinally along the at least one substantially cylindrical body; and forming at least one second groove in the surface of the at least one substantially cylindrical body, wherein at least a portion of one of the at least one first groove and the at least one second groove extends longitudinally at an oblique angle with respect to the longitudinal axis. The methods, in some embodiments, may further include combining a plurality of substantially cylindrical bodies into a concentric assembly.

DETAILED DESCRIPTION

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The illustrations presented herein are, in some instances, not actual views of any particular fluid flow control device, seat retainer, or control valve, but are merely idealized representations which are employed to describe the present disclosure. In the following detailed description, reference is made to the accompanying drawings, which form a part hereof, and in which is shown, by way of illustration, specific embodiments in which the invention may be practiced. These embodiments are described in sufficient detail to enable a person of ordinary skill in the art to practice the invention. However, other embodiments may be utilized, and structural, logical, and electrical changes may be made without departing from the scope of the invention. The illustrations presented herein are not meant to be actual views of any particular device or system, but are merely idealized representations that are employed to describe embodiments of the present disclosure. The drawings presented herein are not necessarily drawn to scale. Additionally, elements common between drawings may retain the same or have similar numerical designations.

Figure 1:
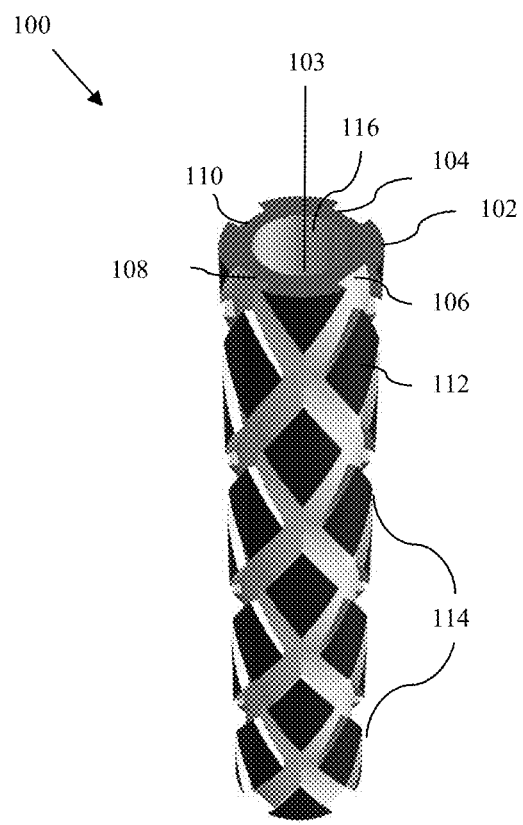
FIG. 1 illustrates a perspective view of a fluid flow control device according to at least one embodiment.

Various embodiments of the present disclosure comprise fluid flow control devices. FIG. 1 illustrates a perspective view of one embodiment of a fluid flow control device 100 configured with a substantially cylindrical body 102 extending along a longitudinal axis 103 and having a sidewall 112. In the depicted embodiment, the sidewall 112 is an exterior surface of the cylindrical body 102 on which a pattern 114 of channels 104, 106, 108, and 110 is situated. In an alternate embodiment the channels may be formed on an interior surface of the cylindrical body 102. In accordance with the present disclosure, various patterns of channel paths may be formed on the sidewall 112 to prevent cavitation of a fluid or to otherwise improve the flow of a fluid through the channels 104, 106, 108, and 110.

Generally, a pattern 114 of channels 104, 106, 108, and 110 may be mapped around the cylindrical body 102 to act as a pressure reducing element for control valves as well as to provide associated downstream elements. The geometry of the channels 104, 106, 108, and 110 may act to control cavitations in fluids (such as liquids and/or gases) to reduce noise. Long lengths of cylindrical tubes may be used to reduce turbulence, shear, and fluid velocity. Some embodiments may be used that are configured to handle entrained solids in single or multi-phase process fluids and slurries. The cylindrical body 102 may be combined with additional cylindrical bodies (see FIG. 3) in a concentric manner to form a concentric assembly that controls the flow of fluid therethrough. In further embodiments, the cylindrical bodies of a concentric assembly may be configured into a ball or sphere shape to enable the formation of spherical flow control elements, such as ball valves, globe valves, and the like. In other embodiments, a cylindrical body 102 may be used as downstream blow down and choke tube elements. As a downstream element, concentric assemblies of cylindrical bodies may be used to produce the pressure drop control either in an on/off configuration or in conjunction with a throttling element upstream that could include a valve, manifold, or plug either in a linear or rotary fashion. In this manner, the fluid flow control device 100 may be implemented to provide desired fluid flow control characteristics.

In the embodiment depicted in FIG. 1, a first channel 104 extends longitudinally along the sidewall 112 of the cylindrical body 102. Channels may also be referred to herein as grooves. As depicted, the first channel 104 extends longitudinally at an oblique angle with respect to the longitudinal axis 103 of the cylindrical body 102. This results in the channel spiraling around the exterior surface of the cylindrical body 112. A second channel 106, may similarly extend longitudinally at an oblique angle with respect to the longitudinal axis 103 of the cylindrical body. The second channel 106 may be configured to extend at an angle opposite the angle of the first channel 106. In the depicted embodiment, a third channel 108 and a fourth channel 110 are also implemented. However, the number of channels and the configuration of channels along the sidewall 112 may vary with each desired application. In the depicted embodiment, the first channel 104, second channel 106, third channel 108, and fourth channel 110 intersect one another as they extend around the cylindrical body 102.

The combination of channel paths and channel intersections forms the pattern 114 on the sidewall 112. The pattern 114 of channels 104, 106, 108, and 110 helps to define the cavitation properties of a fluid flowing through the channels 104, 106, 108, and 110. In at least one embodiment, the pattern 114 of channels may be defined to reduce the cavitations of a liquid passing therethrough. In the depicted embodiment, a diamond pattern is formed on the sidewall 112 of the cylindrical body 102. In further embodiments, other patterns are contemplated, including offset brick patterns, grid patterns, zigzag patterns, and the like. Furthermore, the pattern 114 may be configured to have constant separation such that channel spacing remains constant along the length of the cylindrical body 102, or it may be configured, in some embodiments, to have an expanding separation such that channel spacing changes or varies along the length of the cylindrical body 102.

In some embodiments, the channels 104, 106, 108, and 110 may traverse substantially the entire length of the cylindrical body 102. In further embodiments channels 104, 106, 108, and 110 may traverse only a portion of the length of the cylindrical body 102. In at least one embodiment, the cylindrical body 102 may be formed with an interior cylindrical cavity 116. The interior cylindrical cavity 116 may be configured to house additional cylindrical bodies therein to form a concentric assembly of cylindrical bodies with a plurality of channels extending therethrough.

The cylindrical body 102 may be formed using materials such as ceramics, metals, and plastics. Of course, it is contemplated that other materials may be used as well, depending on the application. In at least one embodiment, the cylindrical body 102 may be manufactured by forming the channels 104, 106, 108, and 110 onto a flat sheet and forming the flat sheet into a cylinder. In one embodiment, the sheet may be rolled into a scroll such that the channels formed on the sheet provide a pattern of channels between each adjacent surface of the rolled scroll. In another embodiment, the cylindrical body 102 may be formed into a cylinder and the channels 104, 106, 108, and 110 may be formed onto the sidewall 112 of the cylinder through a means such as machining.

Figure 2:
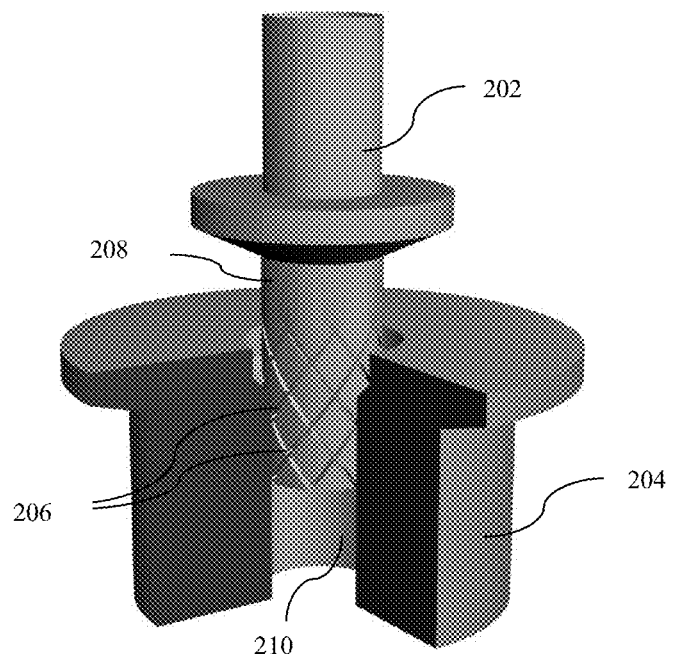
FIG. 2 illustrates perspective cut-away view of the fluid flow control device of FIG. 1 configured as a plug and seat ring according to one or more embodiments.

FIG. 2 depicts one embodiment of the cylindrical body 102 formed as a plug 202 and inserted into a seat ring 204. As depicted, a plurality of channels 206 is formed along the length of the plug 202. The exterior sidewall 208 of the plug may be situated in contact with the interior wall 210 of the seat ring 204. In the depicted embodiment, the channels 206 extend only partially along the length of the plug 202. This enables the plug 202 to prevent the flow of fluid between the exterior sidewall 208 of the plug 202 and the interior wall 210 of the seat ring 204 when the plug 202 is fully inserted into the seat ring 204 (not depicted). Conversely, when the plug 202 is partially unseated from the seat ring 204, the channels 206 provide a path for a fluid to flow between the exterior sidewall 208 of the plug 202 and the interior wall 210 of the seat ring 204. As noted, the pattern formed by the channels 206 provides improved cavitation characteristics and may be used to reduce turbulence, shear, and fluid velocity. In the depicted embodiment, a diamond pattern is used.

The plug 202 and seat ring 204 may be used, in one embodiment, to provide single path multi-stage pressure drop control that could be throttled. This could be used independently in combination with, for example, a stacked disk retainer as discussed in U.S. patent application Ser. No. 12/473,007, which is incorporated herein by reference in its entirety.

In a further embodiment, the flow control device may be incorporated into a valve assembly. The valve assembly, which may also be characterized as a control valve, may include a valve body defining a fluid inlet and a fluid outlet, which in use may be connected to pipes that transport fluid to and from the valve assembly. A plug chamber may be positioned between the inlet and the outlet, and a plug head may be disposed therein. The plug head may be coupled to a shaft and may be configured to move within the plug chamber between a fully open position and a closed position. In the open position, the plug head can be retracted to provide fluid communication between the fluid inlet and the fluid outlet, allowing fluid to flow from the fluid inlet to the plug chamber and into the fluid outlet. In the closed position, the plug head is in abutment with a valve seat, forming a seal that physically interrupts fluid communication between the fluid inlet and the fluid outlet, and effectively blocks fluid flow through the valve body.

The shaft may include an actuator controllably coupled thereto and configured to control the position of the plug head. The actuator may comprise any suitable actuator known to those of ordinary skill in the art. In addition, a positioner may be operably coupled to the actuator. The positioner may comprise any conventional positioner suitable for use with the selected actuator as is known to those of ordinary skill in the art.

Figure 3:
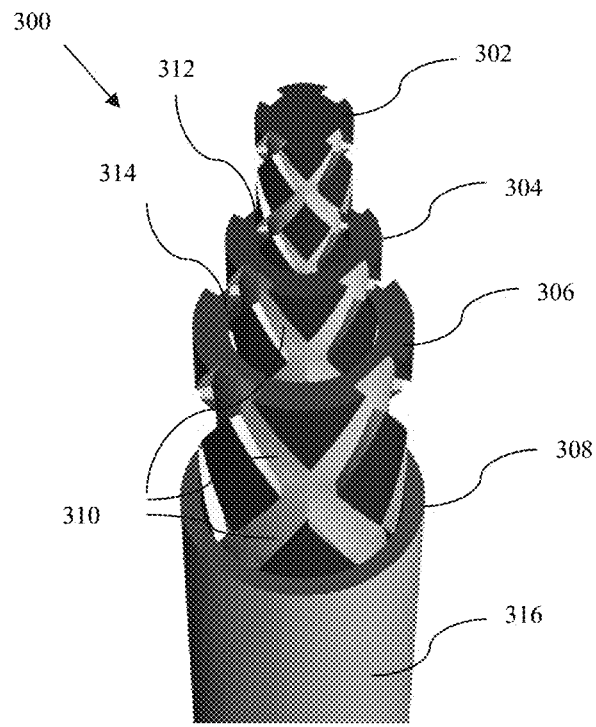
FIG. 3 is a perspective cut-away view of a concentric assembly with a diamond pattern of channels that includes a plurality of cylindrical bodies according to an embodiment of the invention.

FIG. 3 depicts one embodiment of a concentric assembly 300 for controlling the flow of a fluid. As depicted, a plurality of cylindrical bodies 302, 304, 306, and 308 are concentrically configured one within the other to form a concentric assembly 300 with a plurality of channels 310 passing therethrough. In this embodiment, a cylindrical body 302 is situated within an internal cylindrical cavity 312 of another, slightly larger cylindrical body 304. In at least one embodiment, the exterior sidewall of one cylindrical body 302 contacts the interior sidewall of the other cylindrical body 304 such that the channels 310 form a pathway for fluid to travel therebetween. Similarly, an even larger cylindrical body 306 houses the first two cylindrical bodies 302 and 304 in an interior cylindrical cavity 314. Additional cylindrical bodies 302 may be added until a desired size and number of cylindrical bodies is reached. In one embodiment, an external shell 316 may be configured to house each of the cylindrical bodies 302, 304, 306, and 308 to complete the concentric assembly. The external shell 316 may be configured with or without channels 310 formed thereon. In at least one embodiment, the external shell 316 may comprise a pipe in which the concentric assembly 300 is situated to control the flow of a fluid through the pipe. In some embodiments, the concentric assembly 300 and/or cylindrical body 102 may be shrink fitted together. In another embodiment, the concentric assembly 300 and/or cylindrical body may be held together or situated in a pipe or housing using flanges or retaining rings.

Figure 4:
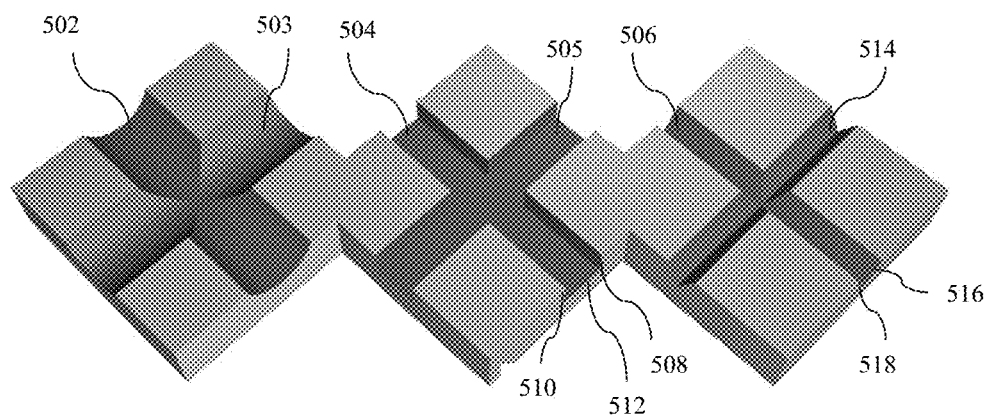
FIG. 4 is a perspective cross-section view of a plurality of channel types according to various embodiments.

FIG. 4 depicts a perspective view and cross section of various channel types that are contemplated in accordance with the present disclosure. However, other channel structures and shapes not shown herein are also contemplated. FIG. 4 depicts three different channel types 502, 504, and 506. The first depicted channel type 502 has a rounded interior surface 503 such that a cross-section of the channel appears as a half circle or half ellipse shape. The second depicted channel type 504 has a squared interior surface 505 such that a cross-section of the channel appears as a half square or half rectangle. The squared interior surface 505 has two wall surfaces 508, 510 formed substantially orthogonal to a bottom surface 512. The third depicted channel type 506 has an angled interior surface 514. The angled interior surface 514 has two wall surfaces 516, 518 formed intersecting at an angle to form a triangle shaped cross-section.

Each different channel type has varying properties and characteristics that affect the flow of a fluid through the corresponding channels. Thus, channel type may be selected according to application to achieve the desired functionality of the channels. In some embodiments, the channel types are not limited to a constant depth or width, but may vary in both or just one of depth and width. In at least one embodiment, the depth and/or width of a channel may increase or decrease as the channel extends along the length of a cylindrical body 102. In other embodiments, the depth and/or width of a channel may fluctuate along the channel path to further define the flow characteristics with each channel.

Figure 5:
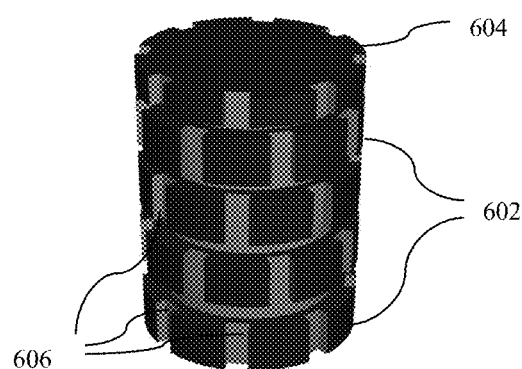
FIG. 5 is a perspective view of a fluid flow control device comprising according to at least one embodiment.

FIG. 5 depicts one alternate channel pattern 602 on the surface of a cylindrical body 604. The depicted pattern 602 is formed by a plurality of channels 606 that intersect one another to form an offset brick pattern. As noted, other channel patterns are also contemplated herein including a diamond pattern, a zigzag pattern, a tooth pattern, or other patterns that form a desired tortuous path. For example, in at least one embodiment, one or more channels may extend longitudinally along the sidewall of a cylindrical body 604 zigzagging back and forth to form a zigzag pattern. In at least one embodiment, the zigzagging channels may not intersect one another, but may be configured to each provide a separate fluid path through the zigzagging pattern.

Figure 6:
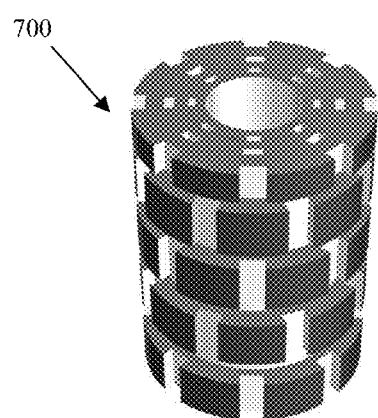
FIG. 6 is a perspective view of a concentric assembly with an offset brick pattern of channels according to at least one embodiment.

FIG. 6 depicts a concentric assembly 700 of cylindrical bodies 604 each having an offset brick pattern 602 of channels formed on a surface thereof. Such an assembly may be used in applications such as downstream blow down and choke tube elements and other related downstream elements. In at least one embodiment, the concentric assemblies and/or cylindrical bodies described herein may be inserted into a fluid path, such as the interior of a pipe.

Additional embodiments of the present disclosure comprise methods of forming fluid flow control devices. Embodiments of such methods are described with reference to FIGS. 1-6. As set forth above, at least some embodiments of a fluid flow control device 102 of the present disclosure may comprise one or more cylindrical bodies 102 that may be concentrically configured to form a concentric assembly 300. The cylindrical bodies 102 may be formed with a substantially cylindrical shape and may include a central cylindrical cavity 116 formed therein. The thickness of the cylindrical bodies 102 may be selected in accordance with the particular application.

Fluid passageways in the form of channels 104, 106, 108, and 110 may be formed onto a surface of the cylindrical bodies 102. In at least some embodiments, the channels 104, 106, 108, and 110 may be formed using a cutter to cut the channels into the cylindrical bodies 102. By way of example and not limitation, the cutter may comprise a hole saw, which may be suitable for forming arcuate channels, or a rotary saw, which may be suitable for forming substantially linear channels. The cutter may plunge partway into the cylindrical bodies 102 to a selected depth without cutting completely through the surface of the cylindrical assembly.

The depth of the channels 104, 106, 108 and 110 may vary depending on the particular application and the thickness of the cylindrical bodies 102. For example, a thinner cylindrical body 102 will only allow for more shallow channels, while a relatively thick cylindrical body 102 will allow for much deeper channels. The width of the channels 104, 106, 108 and 110 may also vary according to the particular application. Typically, the width of the channels 104, 106, 108 and 110 may be determined by the thickness of the cutter used to form the channels 104, 106, 108 and 110. However, a channel 104, 106, 108 and 110 that is wider than the thickness of the cutter may be formed by plunging the cutter two or more times into the surface of the cylindrical body 102 at nearly the same location.

Each cylindrical body 102 may be disposed concentrically within an interior cavity 116 of another cylindrical body 102 to form the concentric assembly 300. The channels 104, 106, 108 and 110 are configured to provide a fluid passageway between the surfaces of the concentric cylindrical bodies 102 of the concentric assembly. In at least one embodiment, the cylindrical bodies 102 are shrink fitted together. In another embodiment, the cylindrical bodies are held together by a flange or other fastening device.

These methods may be practiced in some embodiments with fewer steps or in a different order than that shown. Many additions, deletions, and modifications to the preferred embodiments may be made without departing from the scope of the invention, as hereinafter claimed. Further, the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

While certain embodiments have been described and shown in the accompanying drawings, such embodiments are merely illustrative and not restrictive of the scope of the disclosure, and this disclosure is not limited to the specific constructions and arrangements shown and described, since various other additions and modifications to, and deletions from, the described embodiments will be apparent to one of ordinary skill in the art. Thus, the scope of the disclosure is only limited by the literal language, and legal equivalents, of the claims which follow.

What is claimed is:

1. A method of using a flow control device assembly, comprising:

flowing a fluid through channels of concentrically situated substantially cylindrical flow control bodies, the concentrically situated substantially cylindrical flow control bodies each extending along a longitudinal axis and having sidewalls, the concentrically situated substantially cylindrical flow control bodies comprising the channels defined in and extending along the sidewalls, wherein at least a portion of each of the channels extends at an oblique angle with respect to the longitudinal axis; and directing the fluid through the channels along a pathway for the fluid to travel between an exterior portion of the sidewalls of the concentrically situated substantially cylindrical flow control bodies and an interior sidewall of the flow control device assembly, wherein the channels of at least two of the substantially cylindrical flow control bodies extend to and are axially open at a face of an axial end of the concentrically situated substantially cylindrical flow control bodies, the channels of the at least two of the substantially cylindrical flow control bodies defining radially aligned openings at the face of the axial end.

2. The method of claim 1, further comprising flowing the fluid though a pipe having the concentrically situated substantially cylindrical flow control bodies held within the pipe.

3. The method of claim 1, further comprising flowing the fluid into the axial end of the concentrically situated substantially cylindrical flow control bodies.

4. The method of claim 3, further comprising exiting the fluid at a second axial end of the concentrically situated substantially cylindrical flow control bodies.

5. The method of claim 1, further comprising flowing the fluid into radially aligned openings of the at least two of the substantially cylindrical flow control bodies defined in a face of another axial end of the concentrically situated substantially cylindrical flow control bodies.

6. The method of claim 1, further comprising defining a tortuous path for the fluid as the fluid enters a first radially extending end of the at least two of the concentrically situated substantially cylindrical flow control bodies and exits at a second radially extending end of the at least two of the concentrically situated substantially cylindrical flow control bodies.

7. The method of claim 1, further comprising flowing the fluid through the channels defined in the exterior portion of the sidewalls of the concentrically situated substantially cylindrical flow control bodies.

8. The method of claim 1, further comprising selecting the channels to define a diamond pattern or a zigzag pattern.

9. The method of claim 1, further comprising, flowing the fluid through channels that exhibit a constant width along a length of the channels.

10. The method of claim 1, further comprising, flowing the fluid through the channels comprising at least one of a varying width or a varying depth.

11. A method of using a flow control device assembly, comprising:
flowing a fluid through channels of concentrically situated substantially cylindrical flow control bodies, the concentrically situated substantially cylindrical flow control bodies each extending along a longitudinal axis and having a sidewall, the substantially cylindrical flow control bodies each comprising the channels defined in and extending along the sidewall, wherein at least a portion of each of the channels extends at an oblique angle with respect to the longitudinal axis; and
directing the fluid through the channels along a pathway for fluid to travel between an exterior portion of the sidewall of the substantially cylindrical flow control bodies and an interior sidewall of the flow control device assembly, wherein the channels extend to and are axially open and laterally aligned at an axial end of the substantially cylindrical flow control bodies.

12. The method of claim 11, further comprising entering the fluid into a first axial end of at least one of the substantially cylindrical flow control bodies.

13. The method of claim 11, further comprising discharging the fluid at a second axial end of at least one of the substantially cylindrical flow control bodies.

14. The method of claim 11, further comprising flowing the fluid through the channels where ends of each of the channels intersect at a fluid entrance to the channels.

15. The method of claim 11, further comprising flowing the fluid though a pipe having the concentrically situated substantially cylindrical flow control bodies held within the pipe.

16. A method of using a flow control device assembly, comprising:
flowing a fluid through concentric rings of channels defined by substantially cylindrical flow control bodies, comprising:
entering the fluid at a first axial end of the substantially cylindrical flow control bodies;
directing the fluid through the channels along a tortuous pathway extending along a longitudinal axis of the substantially cylindrical flow control bodies;
exiting the fluid at a second axial end of the substantially cylindrical flow control bodies, wherein openings in the substantially cylindrical flow control bodies are laterally aligned at at least one of the first axial end of the substantially cylindrical flow control bodies or the second axial end of the substantially cylindrical flow control bodies; and
at least one of:
flowing the fluid into an intersection of two channels of the channels that intersect at a fluid entrance to the channels: or
exiting the fluid at an intersection of two channels of the channels that intersect at a fluid exit of the channels.

17. The method of claim 16, further comprising entering the fluid into radially aligned openings defined in a face of the first axial end of the substantially cylindrical flow control bodies.

18. The method of claim 16, further comprising flowing the fluid though a pipe having the substantially cylindrical flow control bodies held within the pipe.

19. The method of claim 16, further comprising selecting the channels to define a diamond pattern or a zigzag pattern.

20. The method of claim 16, wherein at least a portion of each of the channels extends at an oblique angle with respect to the longitudinal axis.

* * * * *